United States Patent [19]
Silverstein

[11] Patent Number: 5,307,256
[45] Date of Patent: Apr. 26, 1994

[54] TRICKLE CHARGE CIRCUIT FOR AN OFF-LINE SWITCHING POWER SUPPLY

[76] Inventor: Robert A. Silverstein, 11 Still Dr., Hudson, Mass. 01749

[21] Appl. No.: 991,766

[22] Filed: Dec. 17, 1992

[51] Int. Cl.⁵ .............................................. H02H 3/335
[52] U.S. Cl. ....................................... 363/21; 363/49; 363/56
[58] Field of Search ............................ 363/21, 49, 56; 323/284, 285; H02M 3/335, 7/5375, 7/5395

[56] References Cited

U.S. PATENT DOCUMENTS

| | | |
|---|---|---|
| 3,988,643 | 10/1976 | Morris. |
| 4,127,885 | 11/1978 | Adam et al. ............................ 361/18 |
| 4,209,826 | 6/1980 | Priegnitz ................................ 363/21 |
| 4,245,289 | 1/1981 | Mineck et al. ......................... 363/41 |
| 4,288,831 | 9/1981 | Dolikian ................................ 361/92 |
| 4,308,576 | 12/1981 | Clark, Jr. .............................. 363/56 |
| 4,642,748 | 2/1987 | Kirk ...................................... 363/56 |
| 4,763,238 | 8/1988 | Maige ................................... 363/21 |
| 4,943,761 | 7/1990 | Fox et al. .............................. 323/283 |
| 5,192,906 | 3/1993 | Nathan .................................. 323/284 |

FOREIGN PATENT DOCUMENTS

| | | | |
|---|---|---|---|
| 301386 | 2/1989 | European Pat. Off. | .... H02M 3/335 |
| 3607018 | 9/1987 | Fed. Rep. of Germany | ......... H02M 3/335 |

Primary Examiner—William H. Beha, Jr.
Attorney, Agent, or Firm—Albert P. Cefalo; Ronald C. Hudgens; Barry Young

[57] ABSTRACT

The invention relates to a switching power supply having a protection device to shutdown the supply of the output voltage and a circuit for providing a trickle voltage while the power supply is shutdown. The power supply is shutdown by lowering the primary bias voltage, the voltage which powers the internal components of the power supply, to a value which disables the production of the output voltage. However, the primary bias voltage is not reduced to ground. Various circuits and devices, such as a restart circuit, may then be powered by the trickle voltage while the power supply is shutdown.

7 Claims, 5 Drawing Sheets

TRICKLE CHARGE CIRCUIT FOR AN OFF-LINE SWITCHING POWER SUPPLY

FIELD OF THE INVENTION

This invention relates to shutting down a power supply while still providing auxiliary power within the power supply.

BACKGROUND OF THE INVENTION

A common problem in the operation of power supplies is damage caused to the power supply by overload conditions. An overload condition, such as a short circuit or other low resistance path between the power supply output terminals, may result in excessive current flow through power supply components. It is possible to prevent this damage by detecting the overload condition and taking corrective action before the power supply components are harmed by excessive current flow.

In inexpensive switching power supplies, overload conditions are typically detected by monitoring the primary current pulses in the source or emitter terminal of the main switching transistor. The monitoring is commonly performed by a comparator, which compares the peak primary current pulses with a predetermined overload threshold, and which signals an overload condition when this threshold is exceeded.

Establishing an overload threshold, however, limits the useful operating range of the power supply. Using a current mode pulse width modulator to generate the primary current pulses, as is commonly done, there is an internal limit on the pulse magnitude which is never exceeded. This internal limit is set either by design within the pulse width modulator to limit peak current, or by default by means of error amplifier saturation. The overload threshold, therefore, must be set below this absolute limit to allow the comparator to detect pulses which exceed the overload threshold during overload conditions. The operating range of the power supply must then be further restricted such that current pulses remain below the overload threshold during normal operation. Therefore, the resulting operating range is constrained within a narrower range than would be achievable without the overload detection circuitry.

Such overload detection methods are further characterized by the need for very fast components. Because overload conditions may result in extremely narrow primary current pulses, the comparator and related components must be chosen so that they are capable of reacting to these very narrow pulses.

In response to the detection of an overload condition, the power supply is typically shut down to avoid damage resulting from excessive current flow. After being shut down and ceasing to produce an output voltage, some power supplies continue to operate at a reduced level. This operation may consist of automatically restarting the power supply after a predetermined delay. However, a power source is required to operate this restart or other circuitry, and the power supply, having been shut down, is unable to provide this power. Instead, the power source is typically generated by an additional transformer on the primary bias. An example of this is found in U.S. Pat. No. 4,209,826 issued on Jun. 24, 1980 to Priegnitz.

In light of the foregoing, it is desirable to have an overload detector which does not limit the useful operating range of a switching power supply. It is further desirable that the overload detector not be required to monitor the magnitude of the primary current pulses, which may become very narrow as overload conditions are approached.

It is also desirable to have a power source available while the power supply is shut down. It is further desirable that the power source be inexpensive and be provided without the requirement of an additional transformer or excessive power dissipation.

SUMMARY OF THE INVENTION

In a broad aspect, the invention relates to a switching power supply having circuit for shutting down the supply of output voltage and a circuit for providing a trickle voltage during shutdown. The trickle voltage is available to power various other circuits while the power supply is shutdown. One such circuit is a restart circuit for restarting the power supply after a shutdown.

In a narrower aspect, the invention relates to a switching power supply having a control circuit powered by a primary bias voltage and a reference voltage. A shutdown circuit is available to cease the production of the output voltage by setting the primary bias voltage within a voltage limit. Another circuit provides a trickle voltage by maintaining the primary bias voltage between the reference voltage and the voltage limit while the power supply is shutdown.

These and other features and advantages of the present invention will become apparent from a reading of the detailed description in conjunction with the attached drawings.

DETAILED DESCRIPTION OF THE PREFERRED EMBODIMENT

Figure 1:
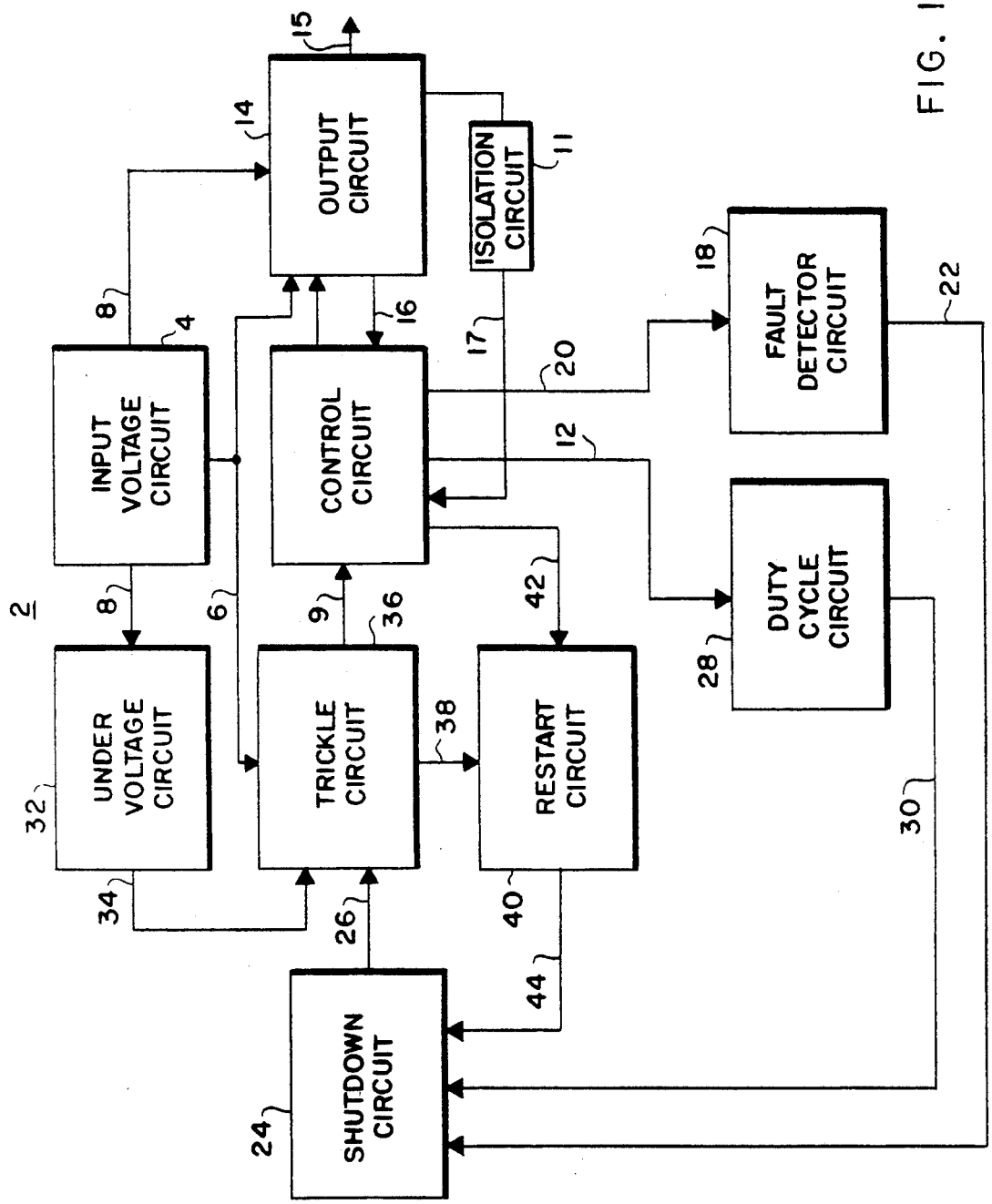
FIG. 1 is a block diagram of a power supply according to the invention.

FIG. 1 shows a block diagram of a power supply 2 according to the invention. An input voltage circuit 4 supplies a primary bias voltage 6 and a bulk line voltage 8. The primary bias voltage 6 initially provides the power, shown as the control voltage 9, to a control circuit 10 which controls the output voltage generated by the power supply 2. The control circuit 10 supplies control signals 12 to an output circuit 14. In response to the control signals 12, the output circuit 14 converts the bulk line voltage 8 to a desired output voltage 15. The control circuit 10 receives a current sense signal 16 and a voltage sense signal 17 from the output circuit 14, which allows the control circuit 10 to monitor the operation of the output circuit 14. The control circuit 10 modifies the control signal 12 in response to the sense signals 16 and 17 so as to maintain the output voltage 15 of the power supply 2 within a desired range.

During operation, power supplies may be damaged if an excessive load is placed at the output of the power supply. Such an excessive load occurs when the power supply outputs are connected together; this condition is commonly known as a short circuit. Damage to a power supply due to a short circuit or other excessive load conditions may be averted if the condition is quickly detected and corrective action, such as shutting down the power supply, is taken.

As shown in the block diagram of FIG. 1, a preferred embodiment of the invention includes a fault detector 18. The fault detector 18 monitors a fault detect signal 20 from the control circuit 10. When a fault condition is detected, the fault detector 18 asserts a shutdown request signal 22. The shutdown request signal 22 is received by a shutdown circuit 24 which may then generate a fault shutdown signal 26. As shown in FIG. 1, the fault shutdown signal 26 is indirectly coupled to the control circuit 10. Assertion of the fault shutdown signal 26 by the shutdown circuit 24 causes the control circuit 10 to cease operation. With the control circuit 10 no longer operating, no control signals 12 are received by the output circuit 14. The power supply 2 is thus shut down and is thereby protected from damage that could be caused by the short circuit or other excessive load conditions. Alternatively, the power supply 2 may be shut down by any other means which halts the supply of output voltage 15, such as by removing the supply of the bulk line voltage 8 to the output circuit 14, or by applying an open circuit to the output voltage 15 within the output circuit 14.

The power supply 2 represented in FIG. 1 is a current mode switching power supply. In switching power supplies, the fault detect signal 20 may be derived from a pulse width modulator (shown in FIG. 2) embedded within the control circuit 10. The fault detect signal 20 from such a pulse width modulator may be asserted when the voltage feedback loop of the pulse width modulator is out of regulation. However, the feedback loop may drop out of regulation due to conditions other than a short circuit or excessive load at the power supply output terminals. These other conditions include interruptions in the supply of the bulk line voltage 8 to the output circuit 14, and turn off of the power supply 2.

These other conditions (i.e. interruptions in the bulk line voltage 8 and turn off of the power supply 2) affect the duty cycle of the control signal 12, generated by the control circuit 10, in a different manner than do short circuit and excessive load conditions. During normal operation, the control signal 12 duty cycle is at or near its maximum when the bulk line voltage 8 is reduced. However, short circuit conditions at the power supply output terminals reduces the duty cycle of the control signal 12 to significantly below its maximum. Thus, a control signal 12 duty cycle at or near its maximum typically indicates that no short circuit condition exists at the power supply output terminals.

Referring again to FIG. 1, a duty cycle circuit 28 receives the control signal 12 from the control circuit 10. In the embodiment of FIG. 1, the duty cycle circuit 28 asserts a shutdown inhibit signal 30 when the duty cycle of the control signal 12 exceeds a specified duty cycle threshold. When the shutdown inhibit signal 30 is asserted, it is received by the shutdown circuit 24. During periods when the shutdown circuit 24 detects the shutdown inhibit signal 30, the shutdown circuit 24 ignores shutdown request signals 22 from the fault detector circuit 18. Thus, while the duty cycle of the control signal 12 exceeds the specified duty cycle threshold, the fault detector circuit 18 is incapable of shutting down the control circuit 10 or of halting the supply of the output voltage 15. The net result of the duty cycle circuit 28 is that the power supply 2 is shut down in response to short circuits, but not in response to interruptions in the bulk line voltage 8.

During periods when the bulk line voltage 8 is significantly below the value specified for the power supply 2, the duty cycle of the control signal 12 may not perform as it would under normal bulk line voltage 8 conditions. In particular, the control signal 12 duty cycle may not fall below the specified duty cycle threshold established by the voltage reference source 82 under short circuit conditions. Thus, a sag in the bulk line voltage 8 could potentially cause the duty cycle monitor 28 to defeat the shut down of the power supply 2 during genuine short circuit or overload conditions. This potential problem is solved by an under voltage circuit 32.

The under voltage circuit 32 of FIG. 1 monitors the bulk line voltage 8 supplied by the input voltage circuit 4. When the bulk line voltage 8 falls below a specified voltage threshold, the under voltage circuit 32 asserts an under voltage shutdown signal 34. As shown in FIG. 1, the under voltage shutdown signal 34 is indirectly coupled to the control circuit 10. Assertion of the under voltage shutdown signal 34 by the under voltage circuit 32 has the same effect as does the assertion of the fault shutdown signal 26 by the shutdown circuit 24. The control circuit 10 ceases operation, control signals 12 are no longer received by the output circuit 14, the supply of the output voltage 15 is halted, and the power supply 2 is effectively shut down. The power supply 2 is thereby protected from possible short circuit or excessive load conditions at the power supply output terminals which might have gone undetected due to the inhibiting effect of the duty cycle circuit 28 under conditions of low bulk line voltage 8.

The under voltage circuit 32 also serves to prevent unwanted attempts by the power supply 2 to restart operation while the power supply 2 is being intentionally turned off. Power supplies are often turned off by halting the supply of the bulk line voltage 8. Moments after the bulk line voltage 8 begins to drop as a result of the power supply 2 being turned off, however, power supplies equipped with automatic restart circuits may attempt to restart operation. The under voltage circuit 32, however, will shut down the power supply 2 as soon as the bulk line voltage 8 falls below the specified voltage threshold, preventing attempts to restart the power supply 2 until the bulk line voltage 8 is restored. Thus, the under voltage circuit 32 will prevent the power supply 2 from "hiccupping" while the power supply 2 is being turned off.

Once a power supply has been shut down in response to a fault or other condition, it is desirable that the power supply circuitry have some power available so that the power supply can restart automatically or perform diagnostic or other functions. The power supply 2 of FIG. 1 provides this power with a trickle circuit 36. The trickle circuit 36 of FIG. 1 requires no additional transformer to obtain power, but rather derives its power from the primary bias voltage 6 provided by the input voltage circuit 4.

As shown in FIG. 1, and as described above, the power supply 2 is shut down in response to either the fault shutdown signal 26 or the under voltage shutdown signal 34. Upon receiving either of these shutdown signals 26 or 34, the trickle circuit 36 modifies the control voltage 9 such that the control circuit 10 is shut down. However, instead of being brought to ground upon shut down, the trickle circuit 36 maintains some of the voltage potential provided by the input voltage circuit 4. Thus, the trickle circuit 36 is capable of providing a trickle voltage 38 to other circuitry.

In the embodiment of FIG. 1, the trickle circuit 36 powers a restart circuit 40 by providing it with a trickle voltage 38. Upon shut down of the power supply 2, the restart circuit 40 receives a shutdown status signal 42 from the control circuit 10. The restart circuit 40, powered by the trickle circuit 36, initiates a delay period of a specified duration after receiving the shutdown status signal 42. At the completion of the delay period, the restart circuit 40 begins to restart the power supply 2 by asserting a restart signal 44. Assertion of the restart signal 44 causes the shutdown circuit 24 to cease asserting the fault shutdown signal 26. If the under voltage shutdown signal 34 is asserted, the power supply 2 remains shut down. However, if the under voltage shutdown signal 34 is not asserted, the trickle circuit 36 completes the restart procedure by restoring the control voltage 9 to the control circuit 10.

In addition to, or in place of, the restart circuit 40, other devices (not shown) may be powered by the trickle circuit 36. These include, but are not limited to, diagnostic devices. A diagnostic device may provide information while the power supply 2 is shut down, such as the cause of the shut down, by activating light-emitting diodes, liquid crystal displays, or the like. For example, in the power supply 2 of FIG. 1, a diagnostic device may indicate whether a shut down was due to an under voltage condition or the detection of a fault. A diagnostic device may also store this or similar information in a memory or on a storage device, the memory, the storage device, and the diagnostic device being powered by the trickle circuit 36.

Figure 2:
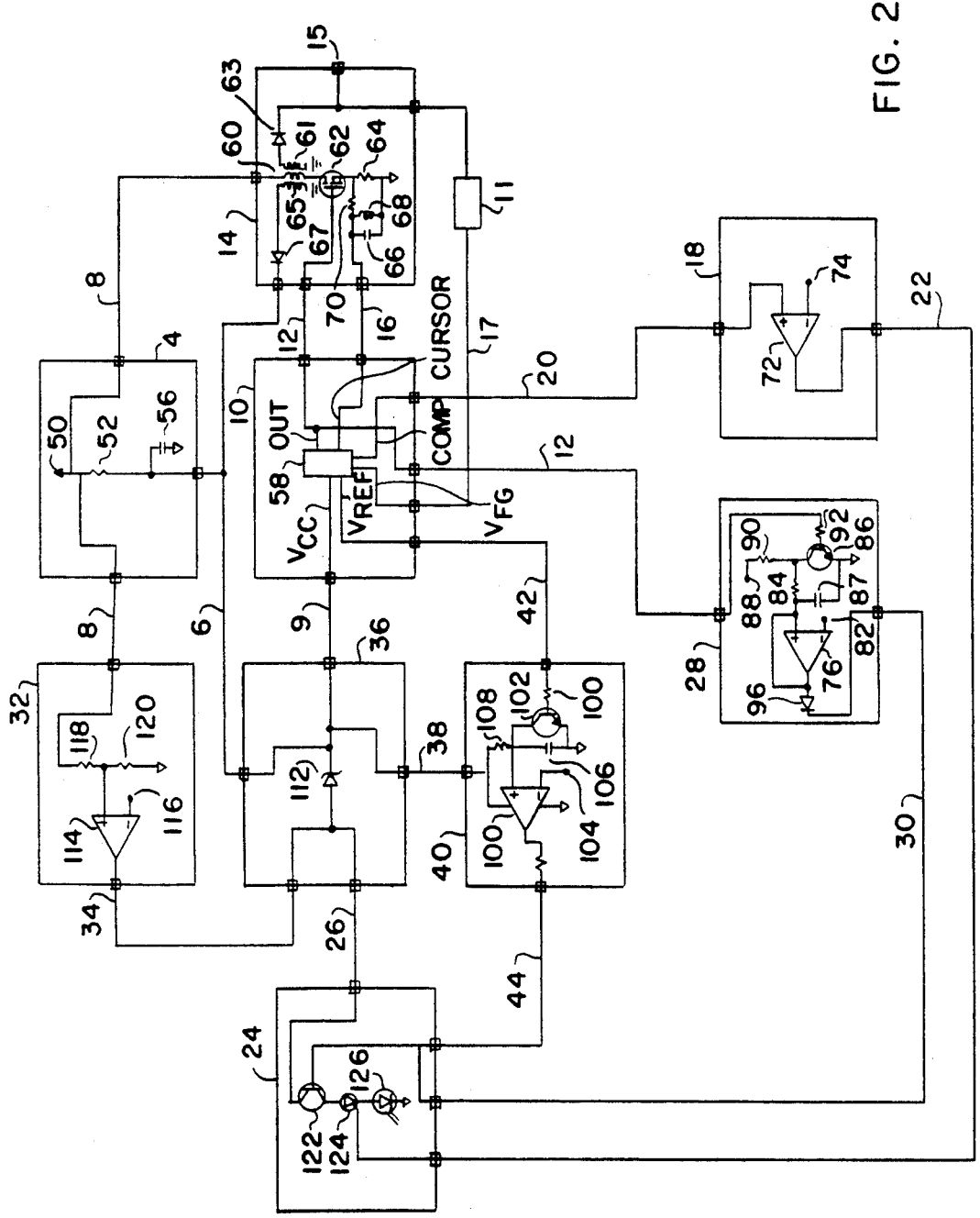
FIG. 2 is a circuit diagram of the power supply of FIG. 1.

FIG. 2 shows a specific implementation of the power supply 2 of FIG. 1. However, the elements of FIG. 1 may be embodied otherwise without deviating from the invention.

In FIG. 2, the input voltage circuit 4 includes a voltage source 50 connected to a resistor 52 in series with a capacitor 56. The primary bias voltage 6 is derived from the junction of the resistor 52 and the capacitor 56. The control circuit 10 of FIG. 2 includes a pulse width modulator 58, embodied here as a UC3842 integrated circuit. The control signal 9 is connected to the $V_{CC}$ pin of the pulse width modulator 58, and the shutdown status signal 42 is connected to the REF pin. The control signal 12 is supplied by the OUTPUT pin of the pulse width modulator 58, and the current sense signal 16 is connected to the CUR_SEN pin. The $V_{fb}$ pin receives the voltage sense signal 17 from the isolation circuit 11. Finally, the fault detect signal 20 is connected to the COMP pin of the pulse width modulator 58. The pulse width modulator 58 normally operates with a $V_{cc}$ voltage of approximately 12 to 25 volts, but effectively ceases to operate when the voltage of $V_{cc}$ is held at approximately 8 volts or less. Other embodiments of the invention may allow the use of different voltage ranges and may include negative voltages.

The output circuit 14 of FIG. 2 includes a transformer 60, a field effect transistor 62, and a resistor 64 connected in series. The operation of the field effect transistor 62 controls the voltage generated in the output winding 61 of the transformer 60 and supplies the output voltage 15 of the power supply 2 through a diode 63. The transformer 60 also has a self-bias winding 65 in series with a diode 67 which provides the primary bias voltage 6 once the bootstrap startup process is completed, as described below. A capacitor 66 and a resistor 68 are connected in parallel with the first resistor 64, and a resistor 70 is connected between the first two resistors 64 and 68. The control signal 12 is connected to the base of the field effect transistor 62, and the bulk line voltage 8 is connected to the inductor 60. The current sense signal 16 is derived from the junction of resistors 68 and 70 with the capacitor 66, and the voltage sense signal 17 is taken from the output winding 61 of the transformer 60 via the isolation circuit 11.

As described above in conjunction with the output circuit 14 of FIG. 2, the self-bias winding 65 of the transformer 60 supplies the primary bias voltage 6. The primary bias voltage 6, in turn, provides power to the various components within the power supply 2, including the control circuit 10. To turn the power supply 2 on, however, a bootstrap startup process is used since no voltage is generated in the self-bias winding 65 when the power supply 2 is off.

The bootstrap startup process begins when the fault shutdown signal 44 ceases to be asserted by the shutdown circuit 24. This allows the capacitor 56 in the input voltage circuit 4 to be charged by current flowing through the resistor 52, which is in series with the voltage source 50. This increases the primary bias voltage 6 until the control voltage 9 exceeds the level required to activate the control circuit 10. Once the control circuit 10 begins to operate, voltage is generated in the transformer 60 and the primary bias voltage 6 is thereafter generated by the self-bias winding 65 of the transformer 60.

The fault detect circuit 18 includes a comparator 72 and a voltage reference source 74. The reference 74 is tied to the negative input of the comparator 72 while the positive comparator 74 input is connected to the fault detect signal 20. The output of the comparator 74 provides the shutdown request signal 22.

The duty cycle monitor 28 of FIG. 2 includes an operational amplifier 76 with a voltage reference source 82 connected to its negative input and a resistor 84 connected between its positive input and the collector terminal of a transistor 86. A capacitor 87 is connected between the positive input of the operational amplifier 76 and the emitter terminal of the transistor 86. A second voltage reference source 88 is coupled to the collector terminal through a resistor 90. The emitter terminal of the transistor 86 is grounded, while the base is coupled to the control signal 12 through a resistor 92. The resistor 84 and capacitor 87 combination operate as an averaging circuit, providing a signal related to the time averaged voltage of the control signal 12 to the positive terminal of the operational amplifier 76. The output of the operational amplifier 76, through a diode 96, provides the shutdown inhibit signal 30.

In the embodiment of FIG. 2, the voltage reference source 82 is chosen such that the operational amplifier 76 asserts the shutdown inhibit signal 30 when the duty cycle of the control signal 12 exceeds 80% of its maximum duty cycle. The maximum duty cycle is the highest duty cycle that the control signal 12 may achieve during normal operation of the power supply 2.

The restart circuit 40 of FIG. 2 includes a comparator 100, whose positive input is connected to the collector of a transistor 102, and whose negative input is connected to a voltage reference source 104. A capacitor 106 is connected between the collector and emitter terminals of the transistor 102, the emitter being grounded. The trickle voltage 38 is also connected to the collector terminal of the transistor 102 through a resistor 108, while the shutdown status signal 42 is connected to the base terminal of the transistor 102 through another resistor 110. The output of the comparator 100, in series with a resistor 108, produces the restart signal 44.

The trickle circuit 36 of FIG. 2 includes a zener diode 112 which is effective to maintain a primary bias voltage 6 of approximately 8 volts while the power supply 2 is shut down. The anode of the zener diode 112 is connected to both the under voltage shutdown signal 34 and the fault shutdown signal 26. The cathode terminal of the zener diode 112 is connected to the primary bias voltage 6, to the control voltage 9, and to the trickle voltage 38.

The under voltage circuit 32 of FIG. 2 includes a comparator 114, with an open collector output, whose negative input terminal is connected to a voltage reference source 116. The positive input terminal of the comparator 114 is connected between two resistors 118 and 120 forming a voltage divider. One side of the voltage divider is grounded, while the other side is connected to the bulk line voltage 8.

The shutdown circuit 24 of FIG. 2 includes a transistor 122. The collector and emitter (or path terminals) of the transistor 122 are connected to the fault shutdown signal 26 and to the anode of a silicon controlled rectifier 124, respectively. The base (or control terminal) of the transistor 122 is connected to both the restart signal 44 and shutdown inhibit signal 30. A light-emitting diode 126 is connected between the silicon control rectifier 124 cathode and ground, with the cathode of the light-emitting diode 126 being grounded. The control terminal of the silicon controlled rectifier 124 is connected to the shutdown request signal 22.

In FIG. 2, the values and identifiers for the components are as follow.

| Reference Numeral | Component Value | Reference Numeral | Component Identifier |
| --- | --- | --- | --- |
| 50 | 300 V | 58 | UC3842 |
| 52 | 30 KΩ | 62 | BUZ80 |
| 56 | 100 uF | 72 | LM358 |
| 64 | 1 Ω | 76 | LM358 |
| 66 | 1 nF | 86 | 2N4401 |
| 68 | 1 kΩ | 96 | 1N4148 |
| 70 | 1 kΩ | 100 | LM358 |
| 74 | 5 V | 102 | 2N4401 |
| 82 | 3.0 V | 112 | 1.5 V zener |
| 84 | 100 KΩ | 114 | LM358 |
| 88 | 5 V | 122 | 2N4401 |
| 90 | 10 kΩ | 124 | 2N5062 |
| 92 | 100 kΩ | | |
| 104 | 5 V | | |
| 106 | 10 μF | | |
| 108 | 470 KΩ | | |
| 110 | 47 KΩ | | |
| 116 | 5 V | | |
| 118 | 1 MΩ | | |
| 120 | 34.8 KΩ | | |

Figure 3:
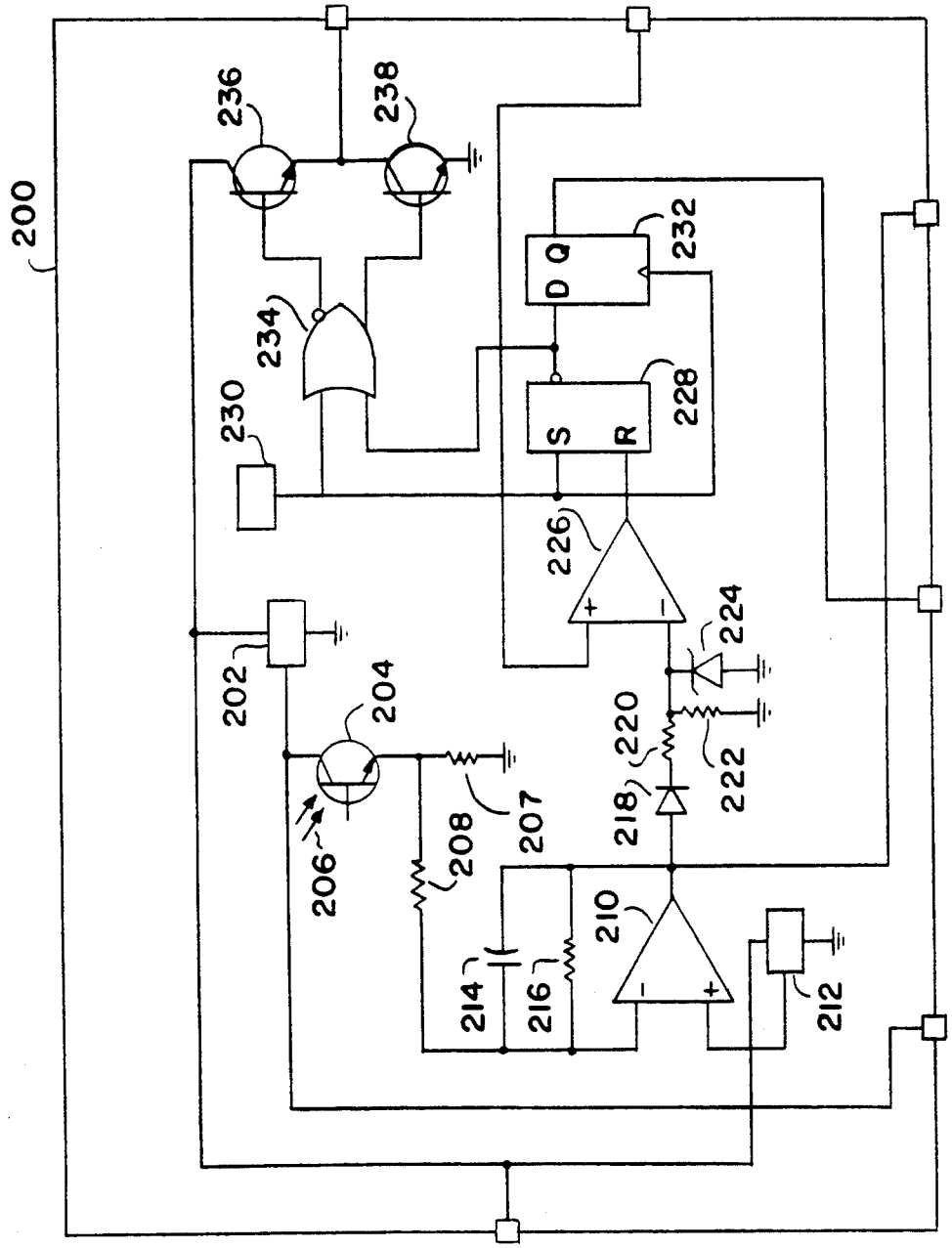
FIG. 3 is a circuit diagram of a control unit, the control unit being another embodiment of a portion of the power supply of FIG. 2.

FIG. 3 shows a discrete implementation of a control unit 200, which performs the functions of both the control circuit 10 and the restart circuit 42, and which replaces the UC3842 integrated circuit 58 of FIG. 2. The control unit 200 includes an internal bias 202 which is connected to the shutdown status signal 42. In the embodiment shown, the internal bias 202 produces a fixed reference voltage of approximately 5 volts as long as the control voltage 9 exceeds approximately 11 volts.

A light-sensitive transistor 204 operates in response to an error feedback signal 206 to produce a current in proportion to the error between the power supply 2 output voltage and the desired voltage. The error feedback signal may be generated in a conventional manner, such as by comparing the power supply 2 output voltage to a reference voltage and driving a light-emitting diode (not shown) in response to the voltage difference. In FIG. 3, the output of the transistor 204 is divided by resistors 207 and 208, and applied to the negative input of an operational amplifier 210. A second internal bias 212 provides a reference voltage to the positive terminal of the amplifier 210. A capacitor 214 and resistor 216 are connected in parallel in the feedback path of the amplifier 210.

The output of the amplifier 210 is level shifted by a diode 218 and divided by resistors 220 and 222. The output is also clamped by a zener diode 224 to limit the response of the control unit 200 to excessive error signals. The modified output signal of the amplifier 210 is compared to the current sense signal 16 by a comparator 226. The output of the comparator 226 drives the reset input of a latch 228. The set input of the latch is driven by the positive-going edge of the output of a oscillator 230. The inverted output of the latch 228 is connected to the data input of a flip-flop 232. The oscillator 230 drives the clock input of the flip-flop 232, and the shutdown inhibit signal 30 is taken from the output of the flip-flop 232. The operation of the latch 228 and flip-flop 232 combination will be described in conjunction with FIG. 4.

An OR-gate 234 has as its inputs the oscillator 230 output and the inverted output of the latch 228. When both of these inputs are at a logic high, the combination of two transistors 236 and 238 connect the control signal 12 to ground. When either of the OR-gate 234 inputs are at a logic low, the transistors 236 and 238 connect the control signal 12 to the control voltage 9.

In FIG. 3, the values and identifiers for the components are as follow.

| Reference Numeral | Component Value | Reference Numeral | Component Identifier |
| --- | --- | --- | --- |
| 207 | 450 Ω | 202 | 5.0 V reference |
| 208 | 20 KΩ | 212 | 1.5 V reference |
| 214 | 1 nF | 224 | 1.0 V zener |
| 216 | 25 KΩ | 228 | S-R flip-flop |
| 220 | 2 KΩ | 232 | D-Type flip-flop |
| 222 | 1 KΩ | | |

Figure 4:
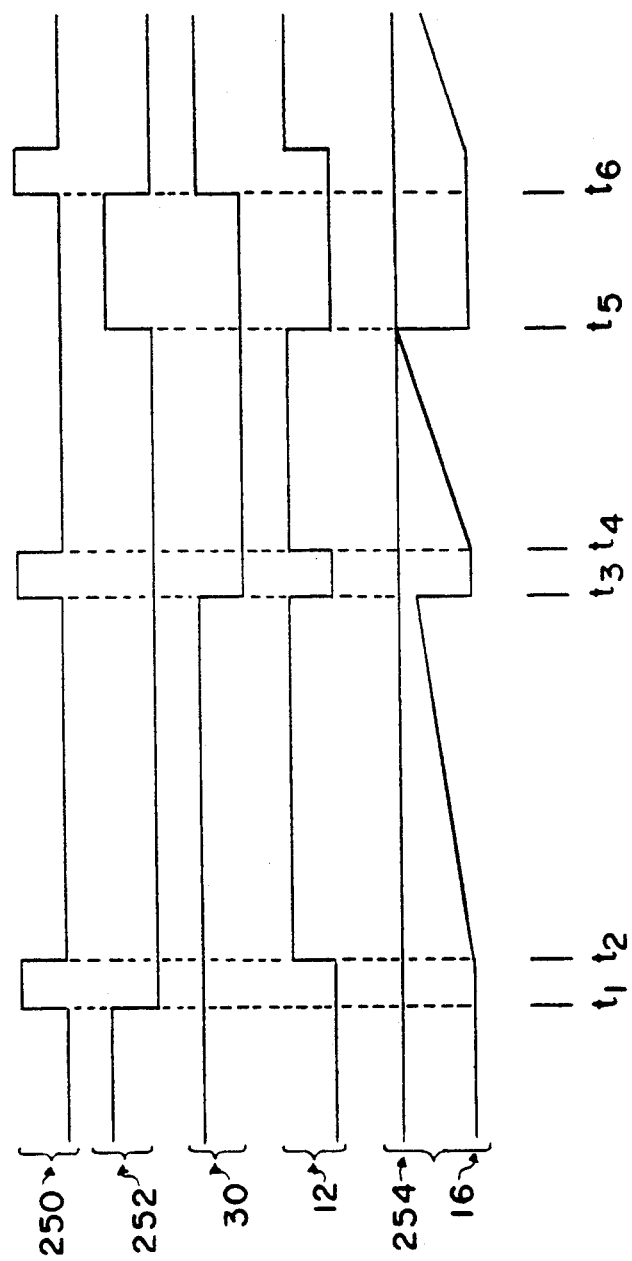
FIG. 4 is a timing diagram of selected signals from the control unit of FIG. 3.

FIG. 4 is a timing diagram of signals selected from within the control unit 200 of FIG. 3. From top to bottom, the signals in FIG. 4 are the oscillator signal 250 produced by the oscillator 230, the latch signal 252 at the inverting output of the latch 228, the shutdown inhibit signal 30, the control signal 12, the error signal 254 at the negative input of the comparator 226, and the current sense signal 16.

At time $t_1$ in FIG. 4, the oscillator signal 250 transitions from low to high, setting the latch 228 and causing the latch signal 252 to go low. The control signal 12 remains connected to ground through the transistor 238 because one of the OR-gate 234 inputs is high.

At time $t_2$, oscillator signal 250 goes low, reversing the output of the OR-gate 234. The control signal 12 is then connected to the control voltage 9 through the transistor 236, and turns the field effect transistor 62 to an ON state. The current drawn though the output circuit 14 causes an increase in the current sense signal 16, as seen in FIG. 4 beginning at time $t_2$.

The current sense signal 16 continues to increase until time $t_3$, when the oscillator signal 250 again goes high. The high oscillator signal 250 reverses the state of the OR-gate 234, grounding the control signal 12, turning off the field effect transistor 62, and lowering the current sense signal 16. The high-going oscillator signal 250 also triggers the flip-flop 232, clocking the low latch signal 30 to the shutdown inhibit signal 30. As shown in FIG. 4, the control signal 12 is grounded at time $t_3$ before the current sense signal 16 has reached the level of the error signal 254.

At time $t_4$, the oscillator signal 250 falls, connecting the control signal 12 with the control voltage 9 and causing the current sense signal 16 to rise in response to current flow through the field effect transistor 62. During this cycle, however, the current sense signal 16 is shown to exceed the error signal 254 at time $t_5$. This causes the comparator 226 to reset the latch 228, which in turn sends the latch signal 252 high. The high latch signal 252 grounds the control signal 12, turns off the field effect transistor 62, and lowers the current sense signal 16 in preparation for the next cycle. As the next cycle begins, at time $t_6$, the rising edge of the oscillator signal 250 triggers the flip-flop 232, causing the previously high latch signal 252 to be stored and applied to the shutdown inhibit signal 30. The gate delays within the latch 228 insure that the flip-flop 232 stores the latch signal 252 as it existed just prior to the time of the rising oscillator signal 250.

The net effect of the latch 228 and flip-flop 232 combination is to set the shutdown inhibit signal 30 high when the duty cycle of the control signal 12 is limited by the rising current sense signal 16. When the duty cycle of the control signal 12 is limited only by the duty cycle of the oscillator signal 250, the shutdown inhibit signal 30 is low. Thus, during periods of high control signal 12 duty cycle, the low shutdown inhibit signal 30 turns off the transistor 122 in the shutdown circuit 24. This renders ineffective attempts to lower the control voltage 9 by turning on the silicon controlled rectifier 124.

Figure 5:
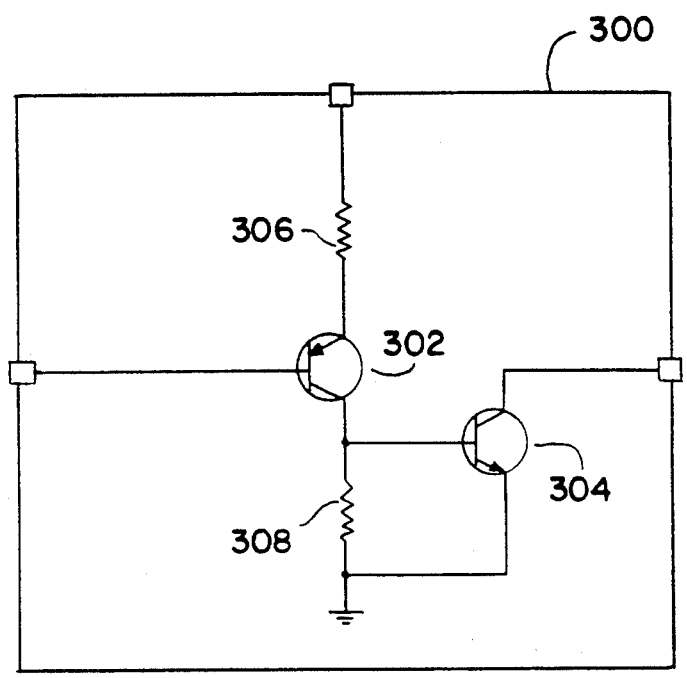
FIG. 5 is a circuit diagram of an instantaneous shutdown circuit used with the power supply of FIG. 2.

FIG. 5 shows an instantaneous shutdown circuit 300 which may be used with the power supply 2 of FIG. 2. The instantaneous shutdown circuit 300 includes a first and a second transistor 302 and 304, and two resistors 306 and 308. The instantaneous shutdown circuit 300 is connected to the power supply 2 of FIG. 1 by connecting the control signal 9 to the base of the first transistor 302, the primary bias voltage 6 to the resistor 306, and the fault detect signal 20 to the collector of the second transistor 304. During normal operation of the power supply 2, the two transistors 302 and 304 are in non-conducting states.

Using the instantaneous shutdown circuit 300, the power supply 2 is shut down in two stages in response to a fault condition or to an under voltage condition. First, as either the fault shutdown signal 26 or the under voltage shutdown signal 34 begin to lower the control voltage 9, a voltage potential develops across the resistor 311 in the trickle circuit 36. This voltage potential turns the transistors 302 and 304 to their conducting states, which grounds the COMP pin of the UC3842 integrated circuit, immediately turning off the pulse width modulator 58. The second stage of the shut down consists of lowering the control voltage 9 to a level below approximately 11 volts.

While specific embodiments of the invention have been shown and described in detail to illustrate the application of the invention principles, it will be apparent that the invention may be embodied otherwise without deviating from the invention set forth in the following claims.

What is claimed is:

1. A switching power supply for producing an output voltage from a bulk line voltage comprising:
   means for providing a primary bias voltage relative to a reference voltage;
   means for producing the output voltage coupled to the bulk line voltage;
   a control circuit coupled to the primary bias voltage and to the means for producing the output voltage and being effective to control the production of the output voltage when the primary bias voltage is beyond a voltage limit, the control circuit being effective to cease production of the output voltage when the primary bias voltage is within the voltage limit, the reference voltage being within the voltage limit;
   means for shutting down the supply of the output voltage by maintaining the primary bias voltage to a voltage within the voltage limit; and
   means for providing a trickle voltage effective to maintain the primary bias voltage at a voltage between the reference voltage and the voltage limit while the supply of the output voltage is shutdown.

2. The switching power supply of claim 1 wherein the means for shutting down the supply of the output voltage comprises a switching means for selectively conducting electrical current between two path terminals responsive to a control terminal and having conductive and non-conductive states, one path terminal being coupled to the reference voltage and the other path terminal being coupled to the means for providing a trickle voltage.

3. The switching power supply of claim 2 wherein the means for providing a trickle voltage has two terminals, one terminal being coupled to the other path terminal of the switching means, and the other terminal being coupled to the primary bias voltage, the means for providing a trickle voltage being effective to maintain a non-zero voltage potential across its two terminals while the switching means is in its conductive state.

4. The switching power supply of claim 3 wherein the means for providing a trickle voltage comprises a zener diode having anode and cathode terminals, the anode terminal being coupled to the other path terminal of the switching means and the cathode terminal being coupled to the primary bias voltage.

5. The switching power supply of claim 4 wherein the primary bias voltage exceeds the reference voltage by approximately 12 to 25 volts when the switching means is in its non-conductive state and the primary bias voltage exceeds the reference voltage by approximately 1 to 8 volts when the switching means is in its conductive state, the voltage limit being between approximately 8 and 12 volts.

6. The switching power supply of claim 5 wherein the reference voltage is at ground.

7. The switching power supply of claim 1 further comprising means for restarting the power supply after the supply of output voltage has been shutdown coupled to the means for providing a trickle voltage, the means for providing a trickle voltage being effective to supply the electrical power required to operate the means for restarting the power supply.

* * * * *